US012241287B2

(12) United States Patent
Shelton

(10) Patent No.: US 12,241,287 B2
(45) Date of Patent: Mar. 4, 2025

(54) GUARD APPARATUS FOR A LATCH

(71) Applicant: Kenneth Shelton, Claremore, OK (US)

(72) Inventor: Kenneth Shelton, Claremore, OK (US)

( * ) Notice: Subject to any disclaimer, the term of this patent is extended or adjusted under 35 U.S.C. 154(b) by 149 days.

(21) Appl. No.: 18/106,865

(22) Filed: Feb. 7, 2023

(65) Prior Publication Data

US 2024/0263491 A1 Aug. 8, 2024

(51) Int. Cl.
*E05B 67/38* (2006.01)
*E05B 9/00* (2006.01)

(52) U.S. Cl.
CPC .............. *E05B 67/38* (2013.01); *E05B 9/002* (2013.01)

(58) Field of Classification Search
CPC . E05B 9/00; E05B 9/002; E05B 67/00; E05B 67/38; E05B 67/383; E05B 2067/386; E05B 17/002; E05C 9/00; E05C 9/004
USPC .............................................................. 70/56
See application file for complete search history.

(56) References Cited

U.S. PATENT DOCUMENTS

| | | | | |
|---|---|---|---|---|
| 4,031,719 A * | 6/1977 | Klingler | E05B 67/38 | 70/56 |
| 4,095,828 A * | 6/1978 | East | E05B 67/383 | 292/148 |
| 4,566,296 A * | 1/1986 | Kochakis | E05B 67/38 | 292/281 |
| 4,896,518 A * | 1/1990 | Appelgren | E05B 67/38 | D8/331 |
| 4,977,763 A * | 12/1990 | Sewell | E05B 67/38 | 70/417 |
| D375,448 S | 11/1996 | Small | | |
| 5,743,118 A * | 4/1998 | Anderson | E05B 13/002 | 292/205 |
| 5,924,314 A * | 7/1999 | Cernansky | E05B 17/2084 | 70/56 |
| 6,367,292 B1 * | 4/2002 | Bunger | E05B 67/38 | 70/56 |
| 7,520,151 B1 * | 4/2009 | Harmon | E05B 17/002 | 383/41 |
| 7,634,878 B1 * | 12/2009 | Motosko | E05B 67/383 | 292/281 |
| 11,085,207 B2 * | 8/2021 | King | E05B 1/0061 | |
| 2003/0012020 A1 * | 1/2003 | King | E05B 17/10 | 362/802 |
| 2006/0201211 A1 * | 9/2006 | Gogel | E05B 67/38 | 70/56 |
| 2012/0011682 A1 * | 1/2012 | Boonstra | E05C 19/08 | 16/384 |
| 2019/0338559 A1 * | 11/2019 | King | E05B 1/0061 | |
| 2019/0383070 A1 * | 12/2019 | Marchl | E05B 65/025 | |

FOREIGN PATENT DOCUMENTS

WO WO2007118586 10/2007

* cited by examiner

*Primary Examiner* — Nathan Cumar

(57) ABSTRACT

A guard apparatus for guarding a latch from tampering when a padlock secures it in a closed position includes a panel with a hole extending therethrough for receiving the padlock. The hole is shaped such that a perimeter edge of the hole engages a body of the padlock when a shackle of the padlock is received through the hole. The panel is positionable to cover the latch when the shackle is received through the hole and secured to the latch.

13 Claims, 6 Drawing Sheets

GUARD APPARATUS FOR A LATCH

BACKGROUND OF THE INVENTION

(1) Field of the Invention

The disclosure relates to latch guards and more particularly pertains to a new latch guard for guarding a latch from tampering when a padlock secures it in a closed position.

(2) Description of Related Art Including Information Disclosed Under 37 CFR 1.97 and 1.98

The prior art relates to latch guards which protect a latch from tampering. The devices disclosed by the prior art are meant to be attached to the latch or to a door, gate, or the like to which the latch is attached. These devices further have a shield component shaped to cover the latch, typically at least over a portion where a padlock attaches to the latch to secure the latch in a closed position. In some of these devices, the shield component is movable away from the latch when the padlock is removed by a pivotal coupling or the like.

BRIEF SUMMARY OF THE INVENTION

An embodiment of the disclosure meets the needs presented above by generally comprising a panel with a hole extending therethrough for receiving the padlock. The hole is shaped such that a perimeter edge of the hole engages a body of the padlock when a shackle of the padlock is received through the hole. The panel is positionable to cover the latch when the shackle is received through the hole and secured to the latch. The panel has a first edge and a second edge positioned opposite each other.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
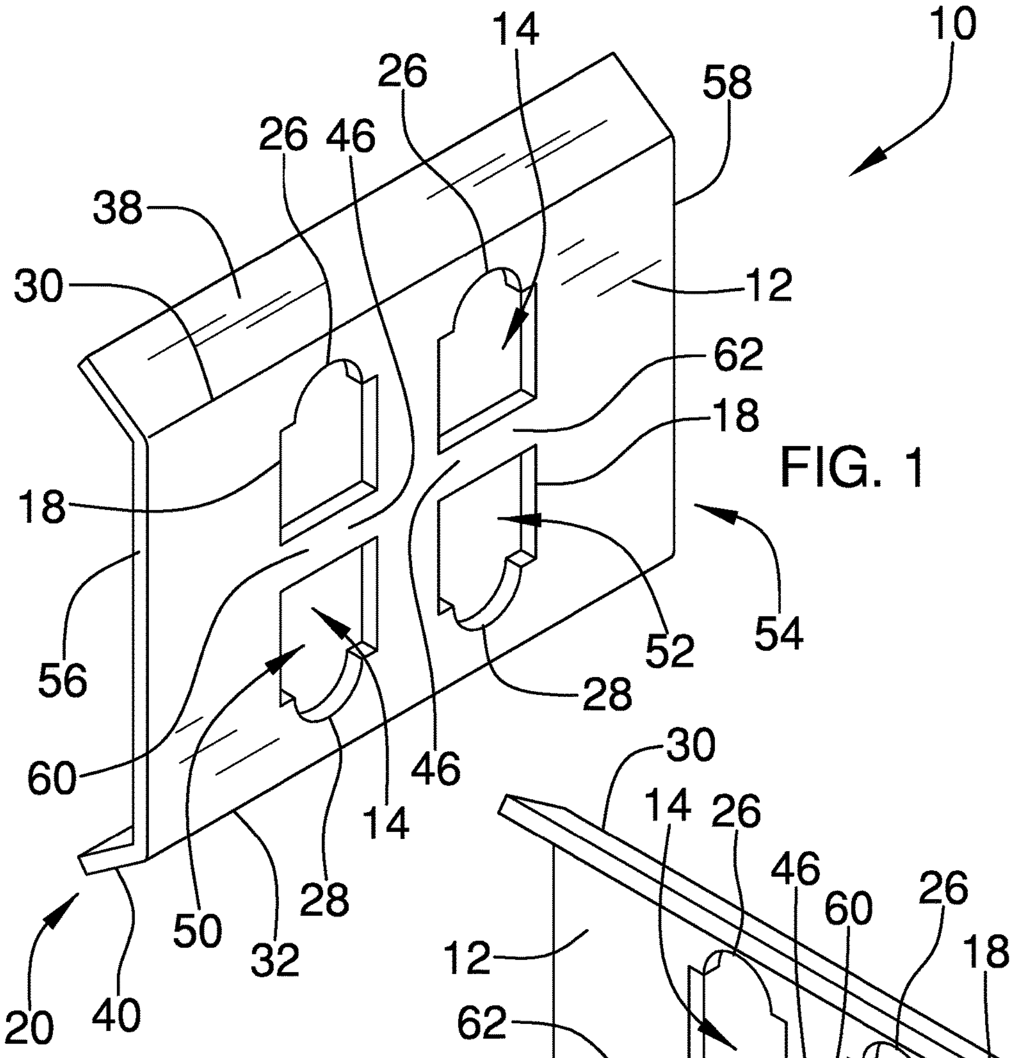
FIG. 1 is a top front side view of a guard apparatus according to a third embodiment of the disclosure.
Figure 2:
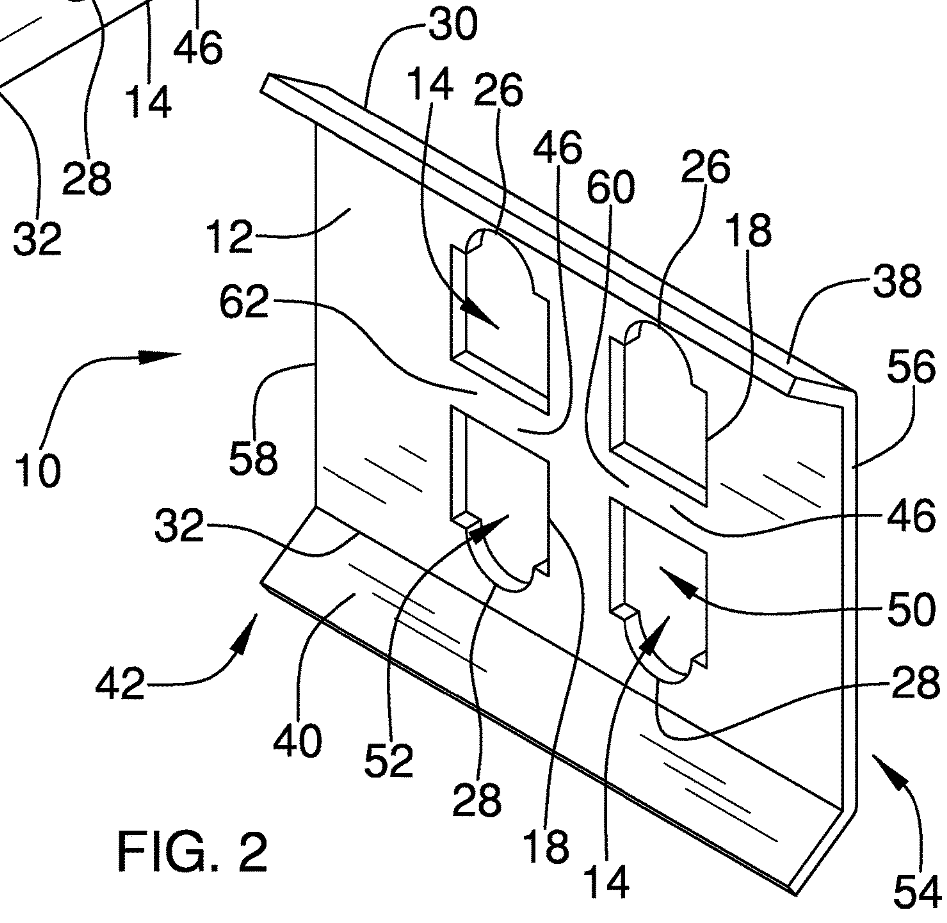
FIG. 2 is a top rear side view of a third embodiment of the disclosure.
Figure 3:
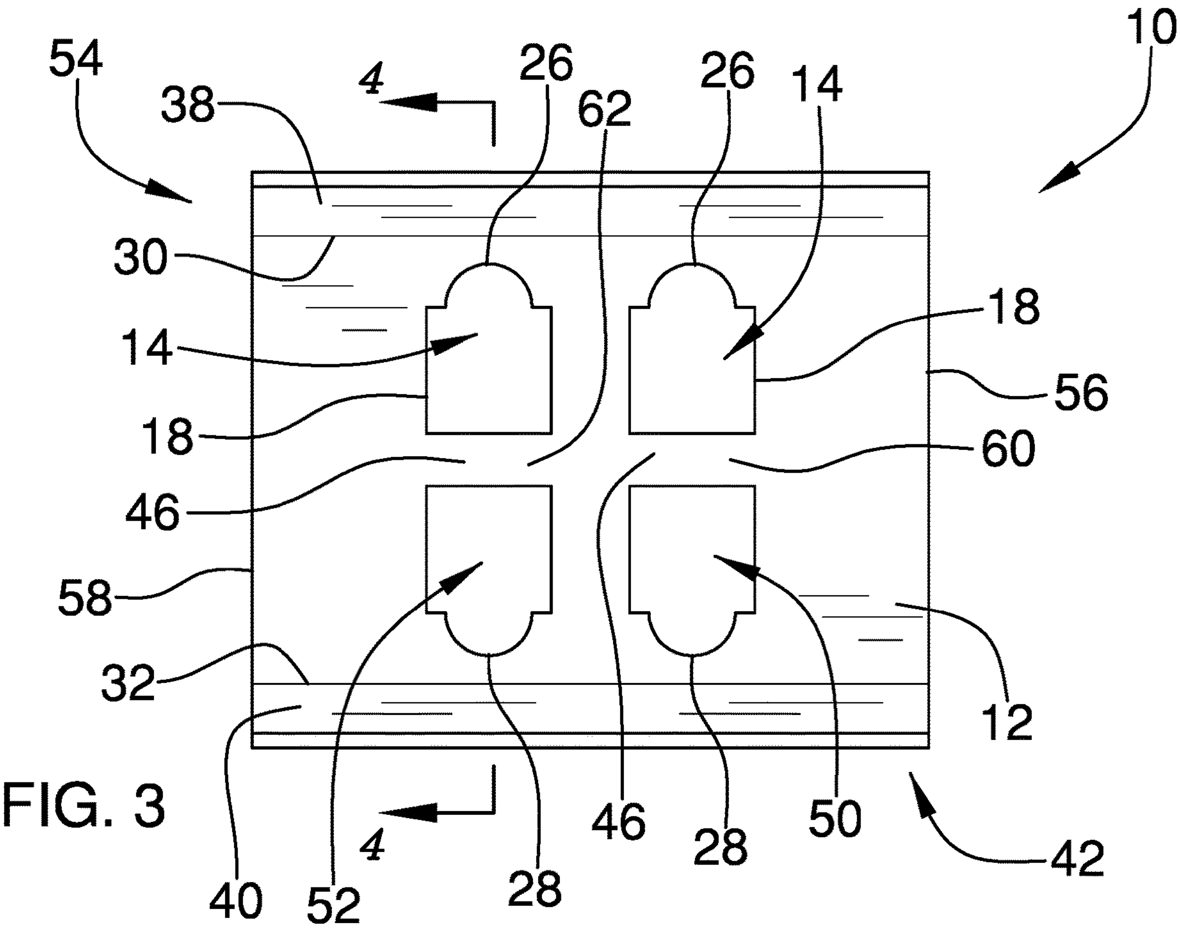
FIG. 3 is a rear view of a third embodiment of the disclosure.
Figure 4:
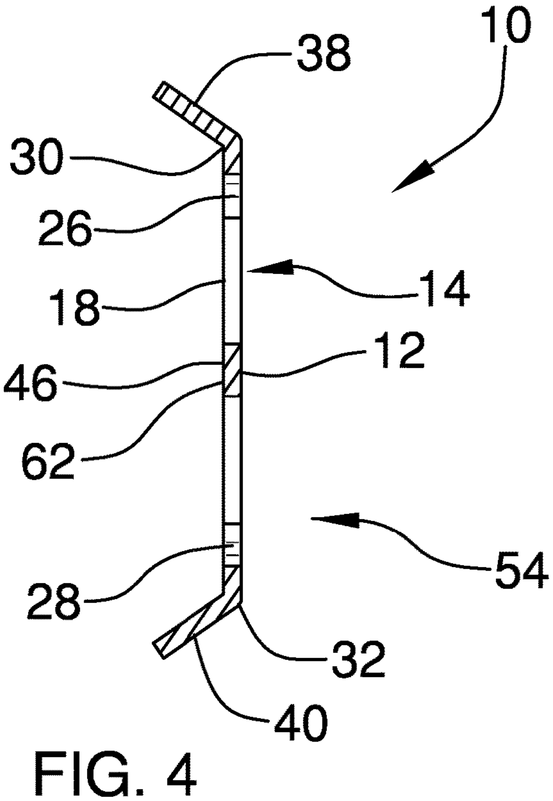
FIG. 4 is a cross-sectional view of a third embodiment of the disclosure taken from Arrows 4-4 in FIG. 3.

With reference now to the drawings, and in particular to FIGS. 1 through 9 thereof, a new latch guard embodying the principles and concepts of an embodiment of the disclosure and generally designated by the reference numeral 10 will be described.

As best illustrated in FIGS. 1 through 9, the guard apparatus 10 generally comprises a panel 12 which has a hole 14 extending therethrough for receiving the padlock 16. The hole 14 is shaped such that a perimeter edge 18 of the hole 14 is configured to engage a body 20 of the padlock 16 when a shackle 22 of the padlock 16 is received through the hole 14. The panel 12 covers a latch 24 when the shackle 22 is received through the hole 14 and secured to the latch 24, and the panel 12 is retained between the body 20 of the padlock 16 and the latch 24. The perimeter edge 18 is shaped to conform to an exterior surface 26 of the body 20 of the padlock 16. The panel has a first edge 30 and a second edge 32 positioned opposite each other. The perimeter edge 18 has a first portion 26 facing away from the first edge 30 of the panel 12 and a second portion 28 facing away from the second edge 32 of the panel 12, and each of the first portion 26 and the second portion 28 is concavely arcuate. If the padlock 16 is a disc lock 34 with a convex annular edge 36, the first and second portions 26, 28 may be shaped to conform to the convex annular edge 36.

A first flange 38 and a second flange 40 are attached to and form a unitary structure 42 with the panel 12. The first flange 38 extends along and rearwardly from the first edge 30 of the panel 12, and the second flange 40 extends along and rearwardly from the second edge 32 of the panel 12. The first edge 30 is positioned opposite the second edge 32. Each of the first flange 38 and the second flange 40 is angled outwardly away from the panel 12. An angle between the panel 12 and the first flange 38 is between 40.0 degrees and 50.0 degrees, and an angle between the panel 12 and the second flange 40 is between 40.0 degrees and 50.0 degrees. The unitary structure 42 has a thickness between 0.100 inches and 0.150 inches and comprises steel. Various types of steel may be used including carbon steel and stainless steel. The unitary structure 42 may also comprise other metals, ceramics, composites, or the like at various thicknesses.

Figure 6:
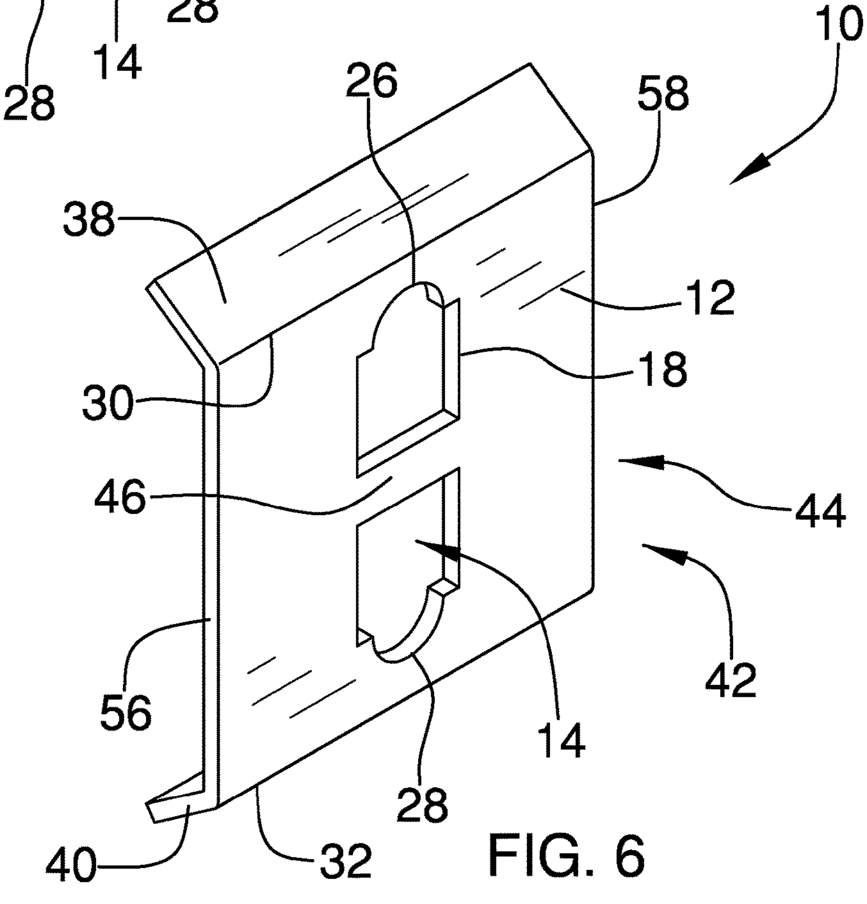
FIG. 6 is a top front side perspective view of a first embodiment of the disclosure.
Figure 7:
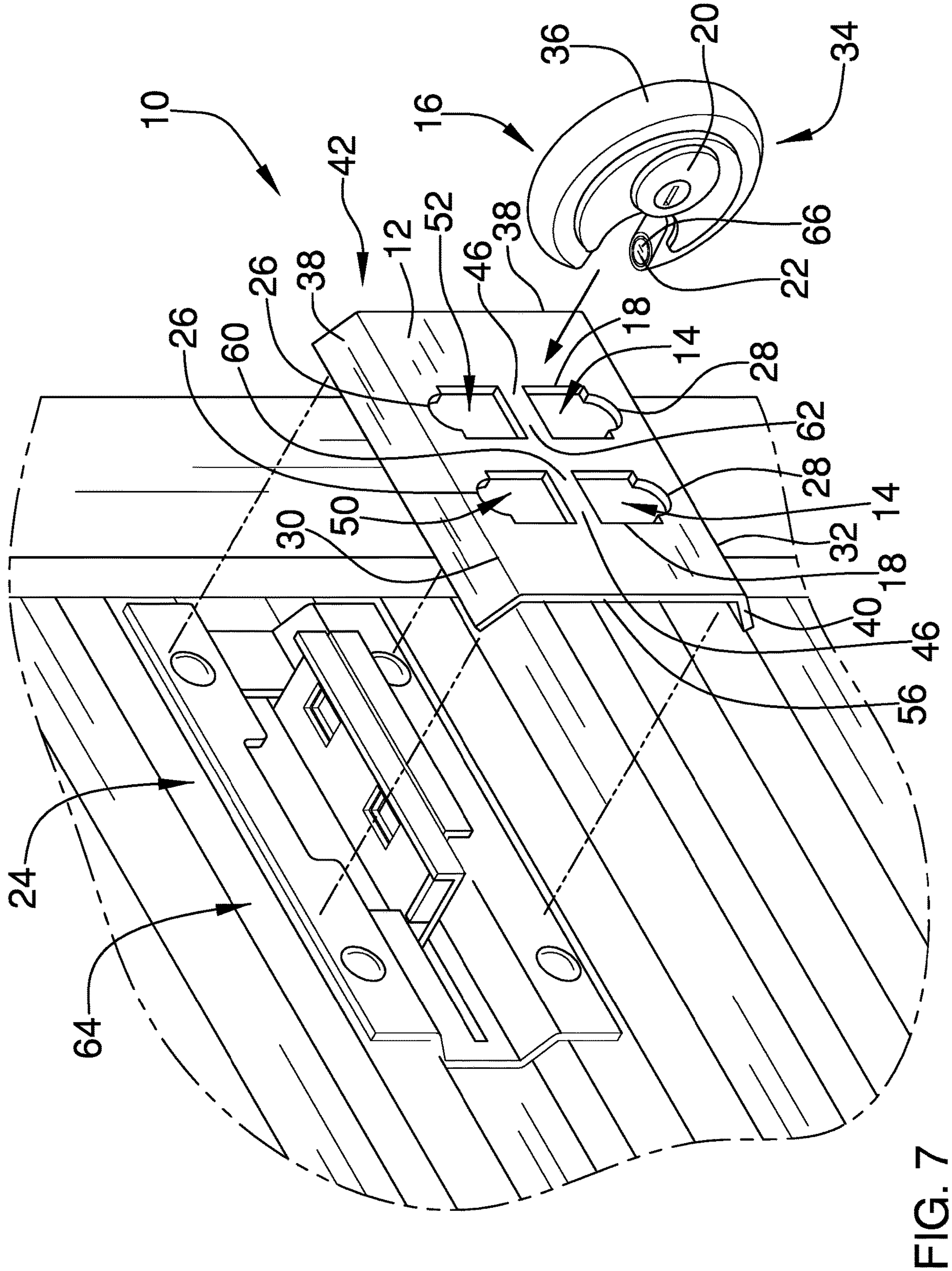
FIG. 7 is an exploded in-use view of a third embodiment of the disclosure.
Figure 8:
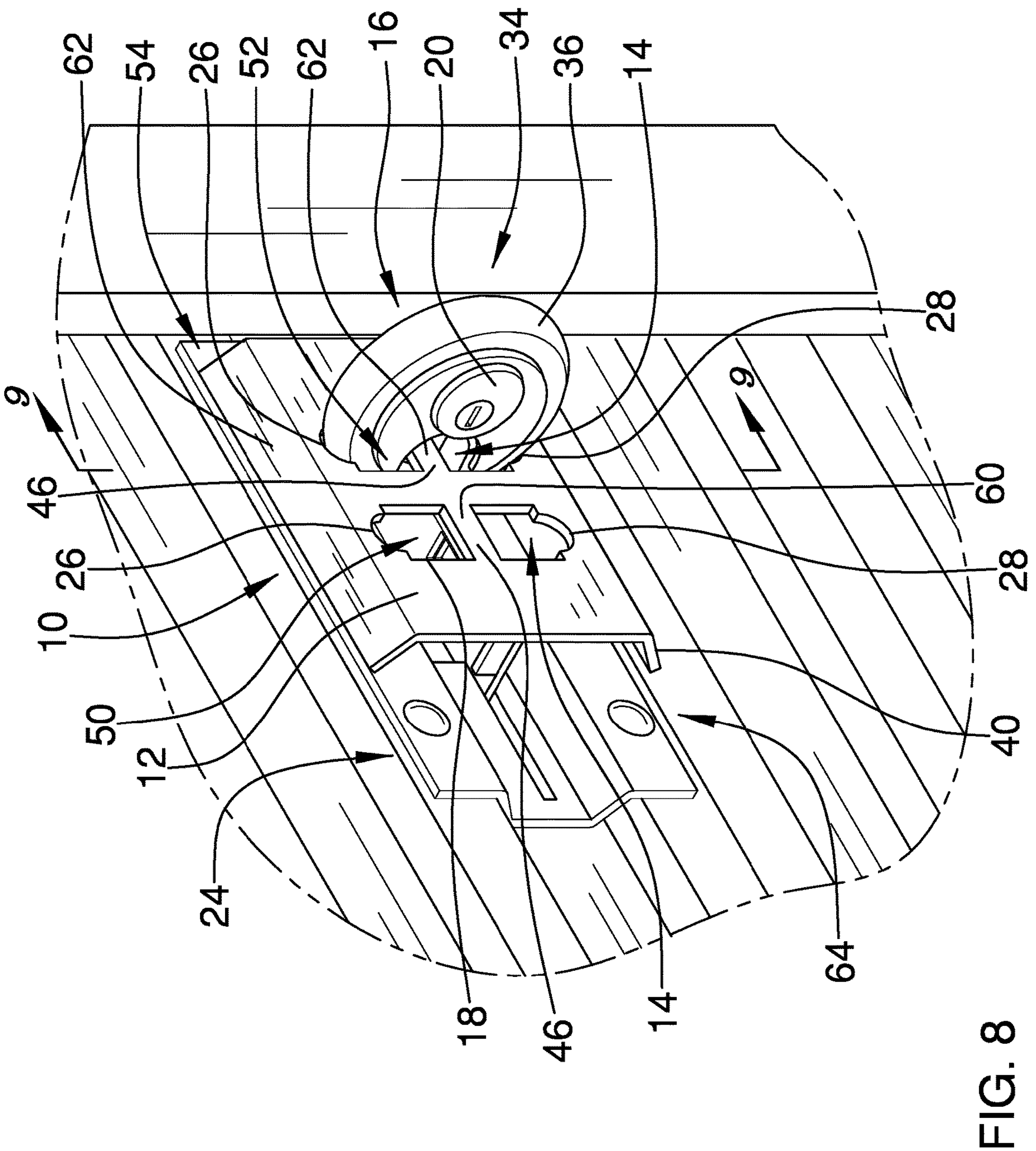
FIG. 8 is an in-use view of a third embodiment of the disclosure.
Figure 9:
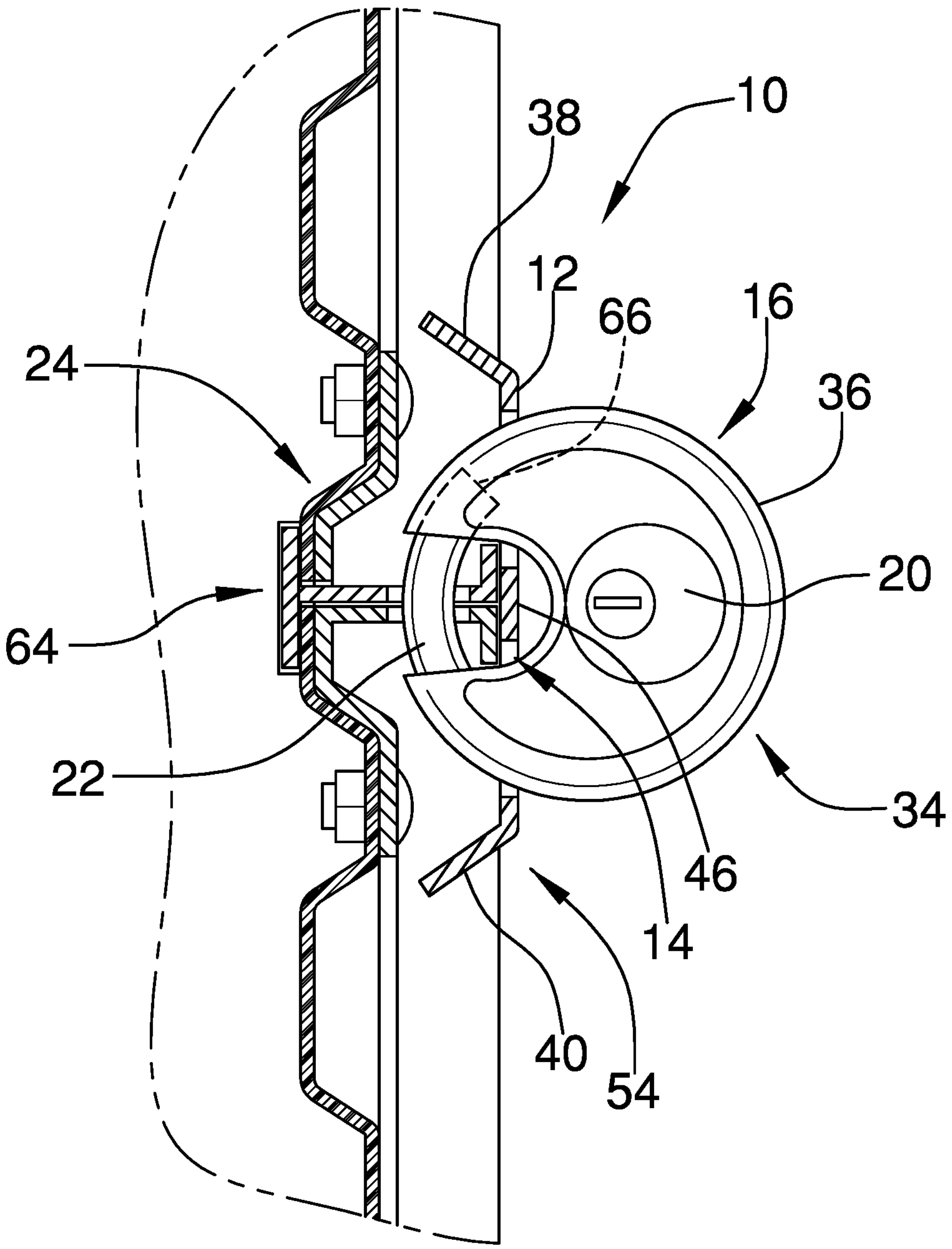
FIG. 9 is a cross-sectional view of a third embodiment of the disclosure taken from Arrows 9-9 in FIG. 8.

In a first embodiment 44 depicted in FIG. 6, a crossbar 46 is coupled to the panel 12 and extends across the hole 14 such that the crossbar 46 is positionable between the shackle 22 and the body 20 of the padlock 16 when the padlock 16 is received through the hole 14.

Figure 5:
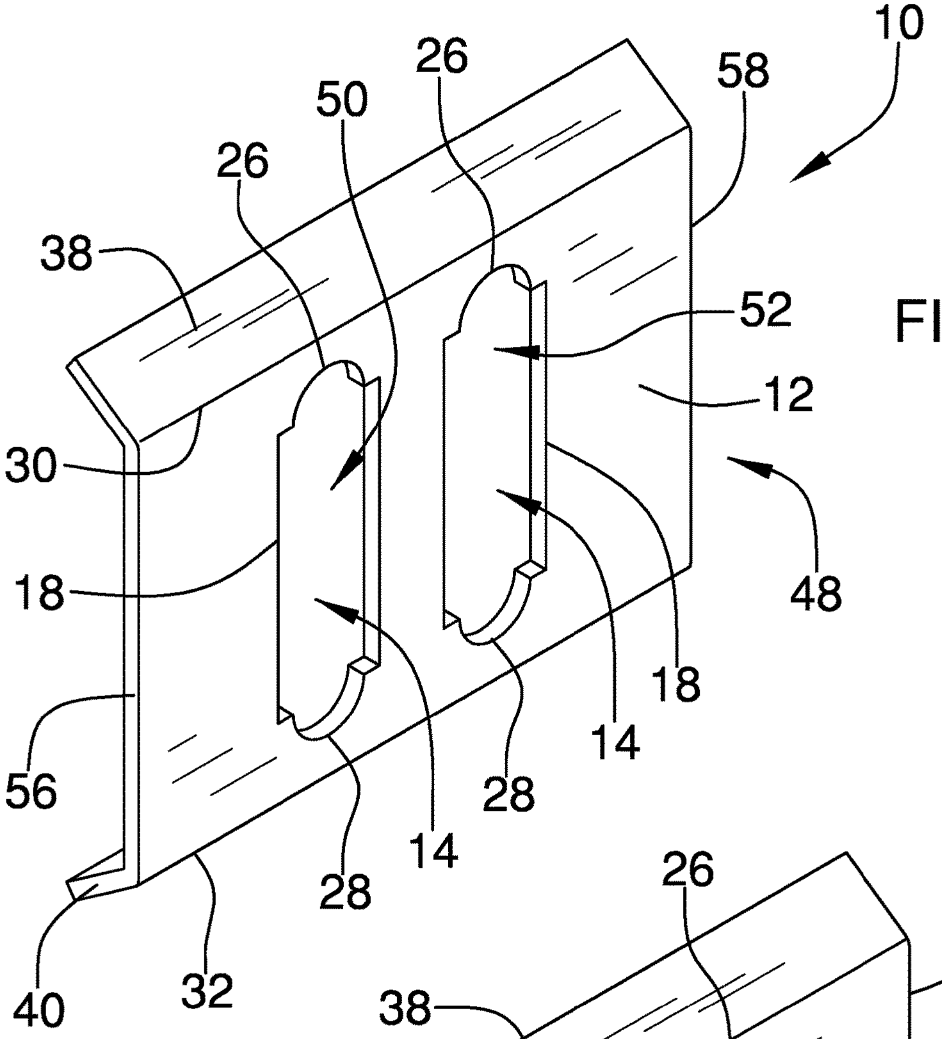
FIG. 5 is a top front side perspective view of a second embodiment of the disclosure.

In a second embodiment 48, depicted in FIG. 5, the hole 14 defines a first hole 50, and the panel 12 has a second hole 52 equivalent in size and shape to the first hole 50. The panel 12 has a third edge 56 and a fourth edge 58 which each extend between the first and second edges 30, 32 of the panel 12. In the second embodiment 48, the first hole 50 and the second hole 52 are spaced from each other in a direction extending between the third and fourth edges 56, 58 of the panel 12.

In a third embodiment 54, the panel 12 has the first and second holes 50, 52 described for the second embodiment 48. A first crossbar 60 is coupled to the panel 12 and extends across the first hole 50 such that the first crossbar 60 is positionable between the shackle 22 and the body 20 of the padlock 16 when the padlock 16 is received through the first hole 50. A second crossbar 62 is coupled to the panel 12 and extends across the second hole 52 such that the second crossbar 62 is positionable between the shackle 22 and the body 20 of the padlock 16 when the padlock 16 is received through the first hole 50.

In use, the shackle 22 of the padlock 16 is inserted through the hole 14, or through one of the first and second holes 50, 52 in the second or third embodiments 52, 54. The shackle 22 is positioned to engage the latch 24 to secure the latch 24 in a closed position 64, and a free end 66 of the shackle 22 is latched to the body 20 of the padlock 16 to secure the padlock 16 to the latch 24. The guard apparatus 10 is retained between the latch 24 and the body 20 of the padlock 16 and covers the latch 24 to prevent tampering of the latch 24.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A guard apparatus for protecting a latch from tampering when a padlock is secured to the latch, the guard apparatus comprising:

a panel having a hole extending therethrough for receiving the padlock, the hole being shaped such that a perimeter edge of the hole is configured to engage a body of the padlock when a shackle of the padlock is received through the hole, the panel being configured to cover the latch when the shackle is received through the hole and secured to the latch, the panel having a first edge and a second edge positioned opposite each other; and wherein the hole defines a first hole, the panel having a second hole equivalent in size and shape to the first hole, the panel having a third edge and a fourth edge each extending between the first and second edges of the panel, the first hole and the second hole being spaced from each other in a direction extending between the third and fourth edges of the panel.

2. The apparatus of claim 1, wherein the perimeter edge is shaped such that the perimeter edge is configured to conform to an exterior surface of the body of the padlock.

3. The assembly of claim 1, further comprising a crossbar being coupled to the panel and extending across the hole such that the crossbar is positionable between the shackle and the body of the padlock when the padlock is received through the hole.

4. The apparatus of claim 1, further comprising a first flange and a second flange being attached to and forming a unitary structure with the panel, the first flange extending along and rearwardly from the first edge of the panel, the second flange extending along and rearwardly from the second edge of the panel.

5. The apparatus of claim 4, wherein the unitary structure has a thickness between 0.100 inches and 0.150 inches.

6. The apparatus of claim 4, wherein the unitary structure comprises steel.

7. The apparatus of claim 4, wherein each of the first flange and the second flange is angled outwardly away from the panel.

8. The apparatus of claim 7, wherein an angle between the panel and the first flange is between 40.0 degrees and 50.0 degrees, an angle between the panel and the second flange being between 40.0 degrees and 50.0 degrees.

9. A guard apparatus for protecting a latch from tampering when a padlock is secured to the latch, the guard apparatus comprising:

a panel having a hole extending therethrough for receiving the padlock, the hole being shaped such that a perimeter edge of the hole is configured to engage a body of the padlock when a shackle of the padlock is received through the hole, the panel being configured to cover the latch when the shackle is received through the hole and secured to the latch, the panel having a first edge and a second edge positioned opposite each other:

wherein the perimeter edge is shaped such that the perimeter edge is configured to conform to an exterior surface of the body of the padlock; and wherein the perimeter edge has a first portion facing away from the first edge of the panel and a second portion facing away from the second edge of the panel, each of the first portion and the second portion being concavely arcuate.

10. A guard apparatus for protecting a latch from tampering when a padlock is secured to the latch, the guard apparatus comprising:

a panel having a hole extending therethrough for receiving the padlock, the hole being shaped such that a perimeter edge of the hole is configured to engage a body of the padlock when a shackle of the padlock is received through the hole, the panel being configured to cover the latch when the shackle is received through the hole and secured to the latch, the perimeter edge being shaped such that the perimeter edge is configured to conform to an exterior surface of the body of the padlock, the perimeter edge having a first portion facing away from a first edge of the panel and a second portion facing away from a second edge of the panel, each of the first portion and the second portion being concavely arcuate; and a first flange and a second flange being attached to and forming a unitary structure with the panel, the first flange extending along and rearwardly from the first edge of the panel, the second flange extending along and rearwardly from the second edge of the panel, the first edge being positioned opposite the second edge, the first flange and the second flange each being angled outwardly away from the panel, an angle between the panel and the first flange being between 40.0 degrees and 50.0 degrees, an angle between the panel and the second flange being between 40.0 degrees and 50.0 degrees, the unitary structure having a thickness between 0.100 inches and 0.150 inches, the unitary structure comprising steel.

11. The assembly of claim 10, further comprising a crossbar being coupled to the panel and extending across the hole such that the crossbar is positionable between the shackle and the body of the padlock when the padlock is received through the hole.

12. The assembly of claim 10, wherein the hole defines a first hole, the panel having a second hole equivalent in size and shape to the first hole, the panel having a third edge and a fourth edge each extending between the first and second edges of the panel, the first hole and the second hole being spaced from each other in a direction extending between the third and fourth edges of the panel.

13. The assembly of claim 10, wherein the hole defines a first hole, the panel having a second hole equivalent in size and shape to the first hole, the panel having a third edge and a fourth edge each extending between the first and second edges of the panel, the first hole and the second hole being spaced from each other in a direction extending between the third and fourth edges of the panel, the lock assembly further comprising a first crossbar and a second crossbar, each of the first and second crossbars being coupled to the panel, the first crossbar extending across the first hole such that the first crossbar is positionable between the shackle and the body of the padlock when the padlock is received through the first hole, the second crossbar extending across the second hole such that the second crossbar is positionable between the shackle and the body of the padlock when the padlock is received through the second hole.

* * * * *